(12) United States Patent
Stolyar et al.

(10) Patent No.: US 7,494,004 B2
(45) Date of Patent: Feb. 24, 2009

(54) METHOD AND APPARATUS FOR MONITORING CONVEYOR BELTS

(75) Inventors: Mark Stolyar, Richardson, TX (US); Daniel Kelly, Knoxville, TN (US); Rajeev Dwivedi, Plano, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/821,440

(22) Filed: Jun. 22, 2007

(65) Prior Publication Data
US 2008/0006513 A1 Jan. 10, 2008

Related U.S. Application Data

(60) Provisional application No. 60/816,167, filed on Jun. 23, 2006.

(51) Int. Cl.
*B65G 43/00* (2006.01)

(52) U.S. Cl. .............................. 198/810.02; 198/810.04

(58) Field of Classification Search .............. 198/502.1, 198/502.4, 810.02, 810.04
See application file for complete search history.

(56) References Cited

U.S. PATENT DOCUMENTS

| 4,372,172 | A | * | 2/1983 | Gombocz et al. | 198/810.04 |
|---|---|---|---|---|---|
| 4,437,563 | A | * | 3/1984 | Oriol | 198/810.02 |
| 4,621,727 | A | * | 11/1986 | Strader | 198/810.02 |
| 4,854,446 | A | * | 8/1989 | Strader | 198/810.02 |
| 5,842,554 | A | * | 12/1998 | Stoxen et al. | 198/322 |
| 6,585,108 | B2 | * | 7/2003 | Travis | 198/810.02 |
| 6,715,602 | B1 | * | 4/2004 | Gartland | 198/810.02 |
| 6,781,515 | B2 | * | 8/2004 | Kuzik et al. | 198/810.02 |
| 7,178,663 | B2 | * | 2/2007 | Schnell | 198/810.03 |
| 2004/0262132 | A1 | * | 12/2004 | Pauley et al. | 198/810.02 |
| 2005/0109587 | A1 | * | 5/2005 | Best et al. | 198/810.01 |
| 2007/0278068 | A1 | * | 12/2007 | Wallace et al. | 198/810.02 |

* cited by examiner

*Primary Examiner*—James R Bidwell

(57) ABSTRACT

A smart belt consists of a standard belt with an embedded sensor capable of wireless communication or visual indicators to notify maintenance for a need for maintenance or replacement. The sensor measures material properties, cycles of operation etc. using a self energizing power source. When the belt requires replacement or maintenance a mode of indication will notify proper personnel.

20 Claims, 4 Drawing Sheets

METHOD AND APPARATUS FOR MONITORING CONVEYOR BELTS

This application is a conversion and claims priority of U.S. Provisional Application No. 60/816,167, filed Jun. 23, 2006.

TECHNICAL FIELD

The invention relates to sensing devices and systems designed to be installed in or on a conveyor belt or related components for detecting conditions and/or collecting data regarding the conveyor and associated equipment.

BACKGROUND OF THE INVENTION

Due to the tremendous volume of mail processed daily in the United States and other countries, mail sorting equipment has become increasingly complex. Sophisticated scanning equipment along with computer controlled high speed conveying and sorting machines are used to process ever increasing volumes of postcards, letters, magazines, parcels and other types of mail. The dynamics of mail processing is the outcome of the interplay of various driving forces that must be controlled. The mail undergoes action of various forces from one point in a machine to another in a number of steps. Action of the forces determines the spatial configuration, such as the location, orientation, instantaneous velocity and acceleration of the mail.

Conveyor belts are one of the most important components in the drive system of current mail sorting machines. Mail is moved through these machines with contact between the belt surface and the mail surface being the primary source of propulsive force for the mail movement. Apart from the propulsive force, constraining forces must be applied to the mail pieces in order to maintain the desired distance between the mail pieces, avoid accumulation of mail within the machine and avoid damage to the mail due to shearing, tearing and bending of the mail. Optimally applied forces allow smooth propulsion of the belt. Action of any unbalanced force may change the dynamic configuration of the belt and mail and may eventually lead to improper functioning of the machine, damage of the mail pieces and/or damage to the machine.

The fundamental structural properties and the harsh dynamics of the process environment make the belts prone to wear and, in many cases, failure. On the other hand, mail processing facilities and equipment are necessarily designed having areas for which access must be restricted during processing. For example, letter and mail processing machines have interlocked doors and covers such that runtime access is prohibited for safety and security reasons. Many areas within mail handling machines and systems cannot be viewed during operation. Additionally, in large material handling systems, it is simply not practical to provide operator access to all areas of the system. Determining the condition of belts used in mail sorting and handling machines can therefore be an involved, cumbersome and eventually expensive process.

The current method of determining whether a conveyor belt needs to be replaced or repaired involves visual and manual inspection by maintenance personnel. The maintenance personnel touch the belt to examine it for surface wear and look for visual indications of fraying and cracking. In addition they examine the belt during operation for improper tracking, scalloping, improper tension, bad alignment etc. Since mail sorting machines may have several hundred conveyor belts, many of which are hidden behind panels or in hard to access areas, the task of inspecting the belts is time consuming and sometimes ineffective. Further, some modes of belt failure have no advance visual indications. As a result, conveyor belts fail during operation reducing the reliability of the machine.

A fundamental issue in high volume processing operations is the conflict between the desire to operate a machine and the need to halt the machine to perform needed belt replacement, maintenance and troubleshooting functions. Generally, maintenance managers must negotiate time with production or operations management for down-time in which to perform needed repairs. There is an element of risk that if a machine is taken down for troubleshooting and repair, it may not be available for the next processing cycle. In many cases, troubleshooting the problem requires more time than the actual repair, once the problem is known. At various sites requiring a high through-put there is a trend to replace belts whether needed or not needed in order to prevent costly downtime.

Timely diagnostics of belt parameters suggest the state of belt. With the state of belt known, the preventive action and the schedule for maintenance can be determined. Also the cost associated with the replacement of belts due to uncertainties can be eliminated.

SUMMARY OF THE INVENTION

The present invention addresses some of the problems currently associated with maintenance of mail sorting and processing equipment and systems, in particular conveyors and conveyor belts used in these applications. Typically, such belts are formed from a synthetic rubber or similar polymer and may or may not be reinforced with a fabric like material or strands of a high tensile material such as polyester fiber. The invention provides for monitoring the condition and operation of conveyor belts during operation with sensors embedded in the belts. Instead of shutting down a conveyor and asssociated equipment for trouble-shooting, the "health" of the conveyor can be determined during run-time. Sensors and/or monitors in accordance with the invention are designed to monitor belt condition, operation, state of wear, failure or timing problems. Sensors in accordance with the invention may be used to detect specific maintenance problems such as stretching, scalloping and similar conditions.

A method of a monitoring conveyor including a conveyor belt includes attaching a sensor that generates a signal indicating one of a condition or state of the conveyor to the belt and monitoring the signal generated by the sensor to determine the condition or state. In one variation, the sensor is an embedded piezoelectric element, magneto elastic or SAW micro sensor. The sensor may be used to monitor parameters such as belt wear, belt tension, the total number of cycles that the belt has traveled, scalloping, temperature, fatigue and stretching. The sensor generates a radio frequency or visual indicator of the measured parameter.

In another aspect, the invention provides a system for monitoring the condition and state of a conveyor including a conveyor belt. The system includes a sensing element attached to the conveyor belt and an indicator connected to the sensing element for generating a signal indicating the state or condition. The system may include one or more magnets mounted in proximity to the belt for generating a magnetic field that interacts with the sensor to produce an electric current and/or indicate a condition or state of the conveyor belts or a related component such as a bearing, pulley or roller. In one variation, the sensing element or elements include a piezoelectric sensor. The sensor includes a signaling means such as a RF transmitter and receiver or a light source to alert an operator or maintenance personnel to a condition or state of the belt.

BRIEF DESCRIPTION OF THE DRAWINGS

A more complete understanding of the invention may be had by reference to the following description taken in conjunction with the drawings wherein like numerals designate the same and like elements and wherein.

DETAILED DESCRIPTION

Figure 1:
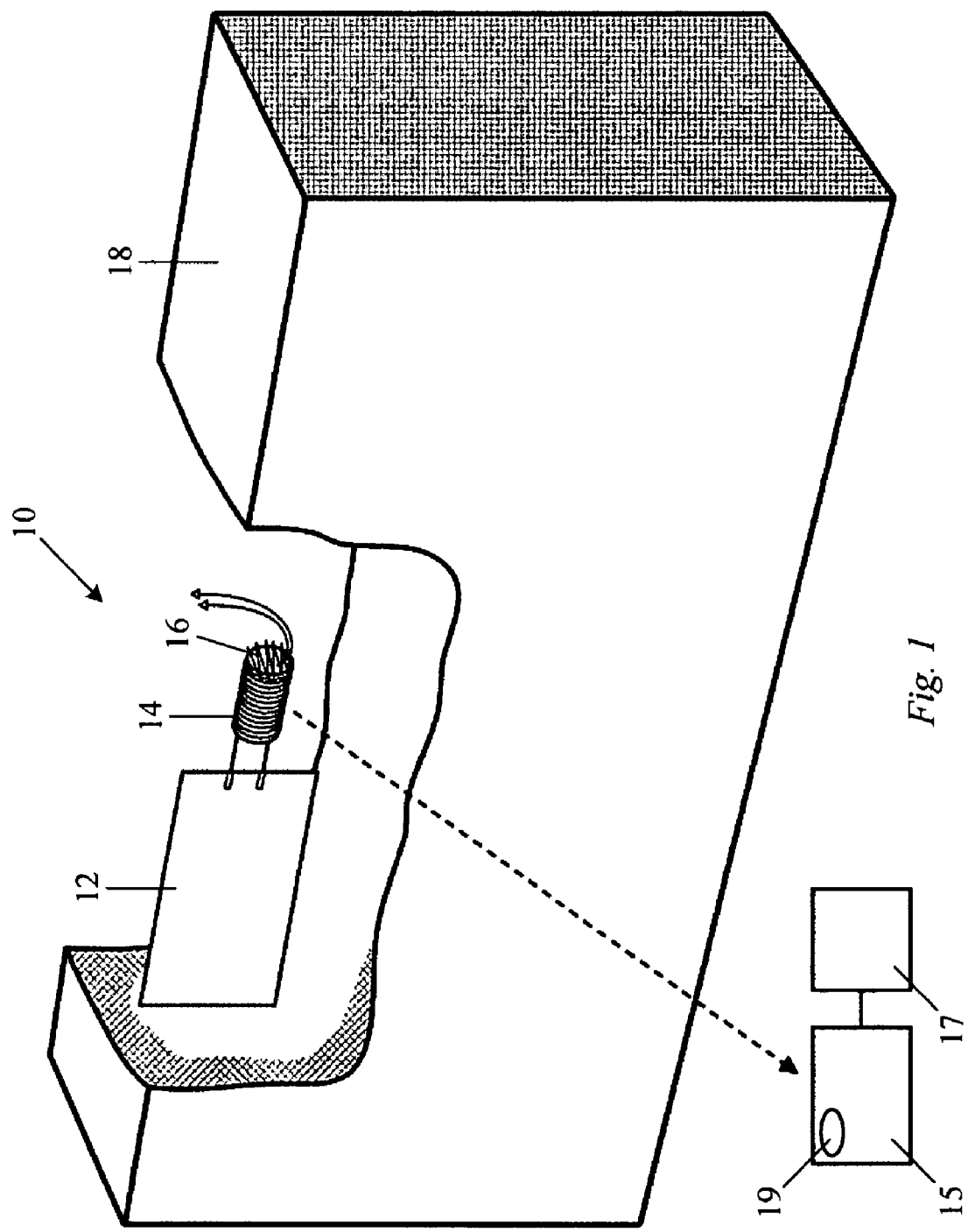
FIG. 1 is a partial cut-away view of a conveyor and sensor in accordance with the invention.

Referring to FIG. 1, an imbedded belt cycle counter 10 includes a piezoelectric bend sensor 12, an induction coil 14 and an antenna 16. Bend sensor 12 is embedded in conveyor belt 18 such that when the section of the belt 18 carrying imbedded sensor 12 bends or deflects as it passes around a pulley or roller, an electrical potential is generated by piezoelectric bend sensor 12. The electric potential across the bend sensor creates a current in induction coil 14 which is coupled to antenna 16 which in turn generates a corresponding RF signal. The signal is received by a locally mounted receiver 15 and monitor 17 including a counter (hardware or software function) that counts and stores the number of signals received from sensor 12. When the recorded number of cycles reaches a predetermined number as indicated on a screen display 19 or other suitable means, belt 18 is scheduled for inspection, maintenance or replacement in accordance with a predetermined maintenance scheme.

Figure 2:
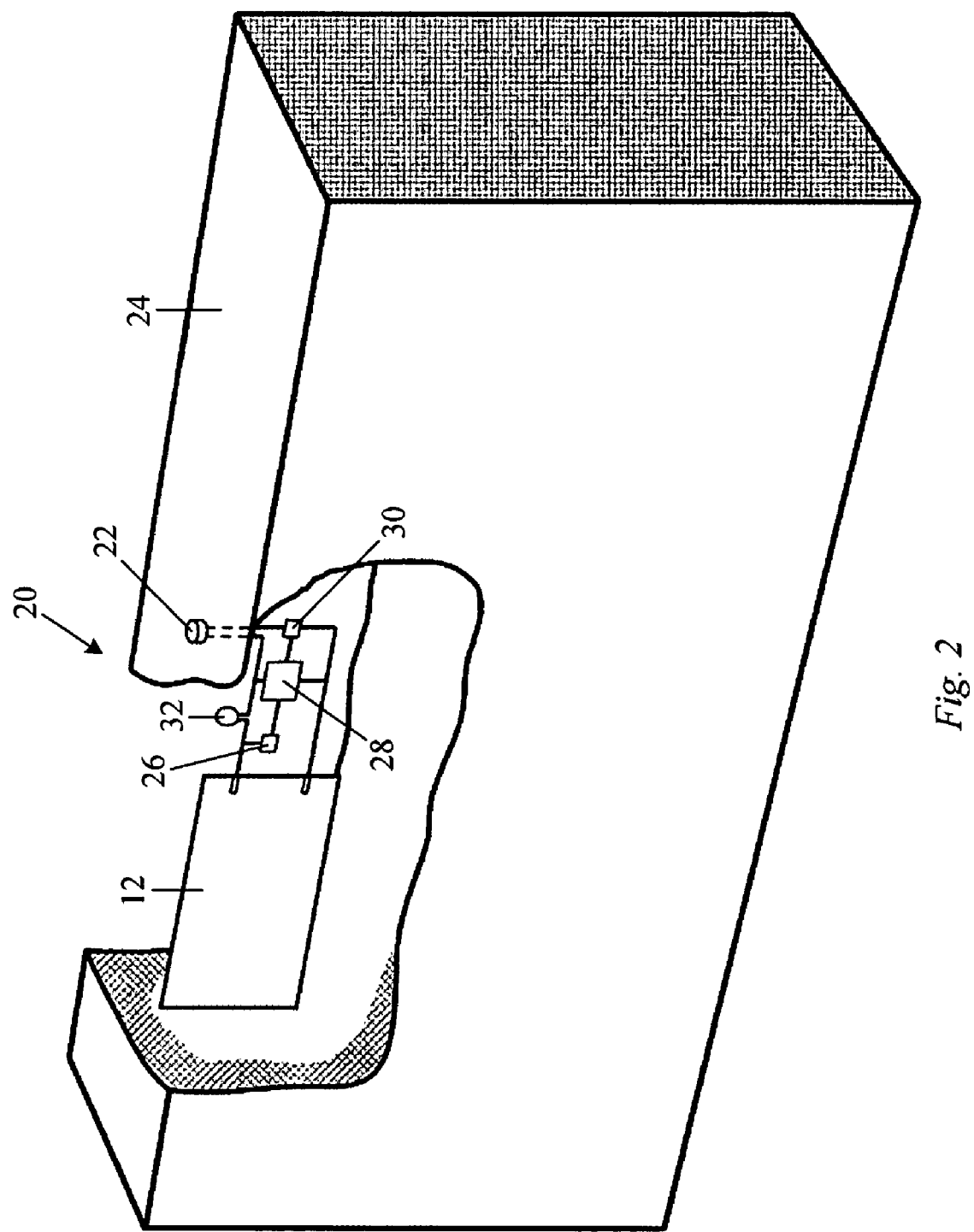
FIG. 2 is a partial cut-away view of a second conveyor and sensor in accordance with the invention.

Referring to FIG. 2, an imbedded cycle counter 20 includes an exposed LED 22 for alerting maintenance personnel when a conveyor belt 24 has been in service for a predetermined number of cycles. LED 22 is mounted at the surface of conveyor belt 24 or in a small recess in the surface of the belt such that it may be observed when the belt is in operation. Counter 20 includes a processor and display circuit including timer 26, a processor/counter 28, an LED switch 30 and capacitor 32. Each time the section of conveyor belt 24 where counter 20 is embedded passes around a bend, the electrical potential generated by piezoelectric sensor 34 causes processor/counter 28 to increment the total count of cycles that the belt has traveled. When the count reaches a predetermined number, processor/counter 28 activates LED switch 30, causing LED 22 to glow, alerting maintenance personnel that belt 24 is due for inspection, maintenance or replacement. Cycle counter 20 may further include onboard memory for storing the date of installation of the belt and other pertinent information.

Figure 3:
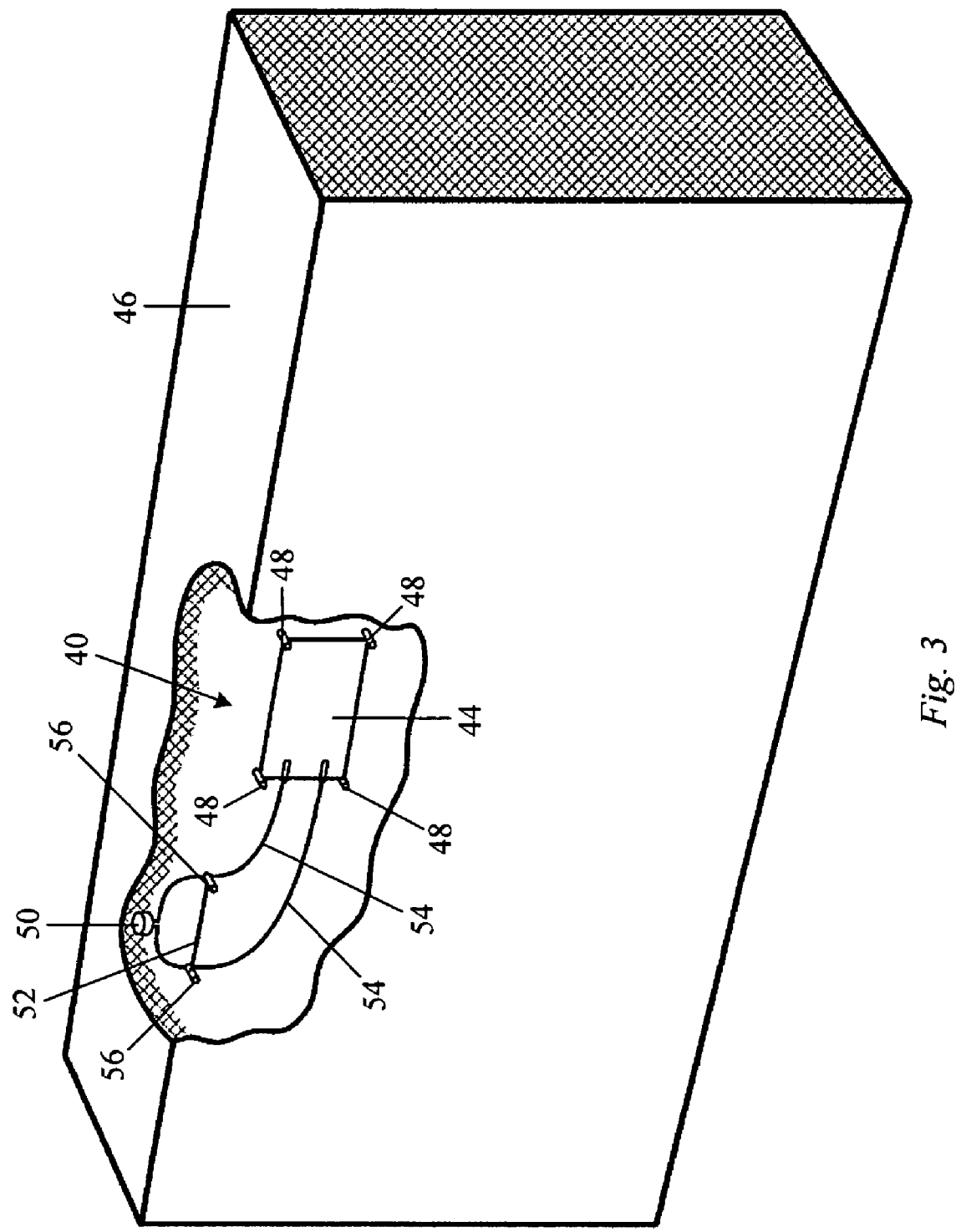
FIG. 3 is a partial cut-away view of a third conveyor and sensor in accordance with the invention.

FIG. 3 illustrates an embedded belt fatigue or stretching sensor 40 including a piezoelectric stress sensor or element 44 secured in position in conveyor belt 46 with a plurality of pin-like constraints 48. An LED 50 is connected to stress sensor 40 in a circuit having wires 52 and 54 in parallel. Wire 52 is installed between nodes 56 that cannot normally move relative to each other and/or the belt surface. Wire 52 is pre-tensioned and pre-calibrated such that the wire will break or fracture when subjected to a predetermined level of force. In normal operation, any current generated by stress sensor 44 passes through wire 52, bypassing LED 50. When belt 46 stretches or is otherwise sufficiently distorted or deflected to break wire 52, the electric potential generated by stress sensor 44 causes a current to flow through wire 54. The current flowing through wire 54 will then cause LED 50 to glow, alerting maintenance personnel to the condition.

Figure 4:
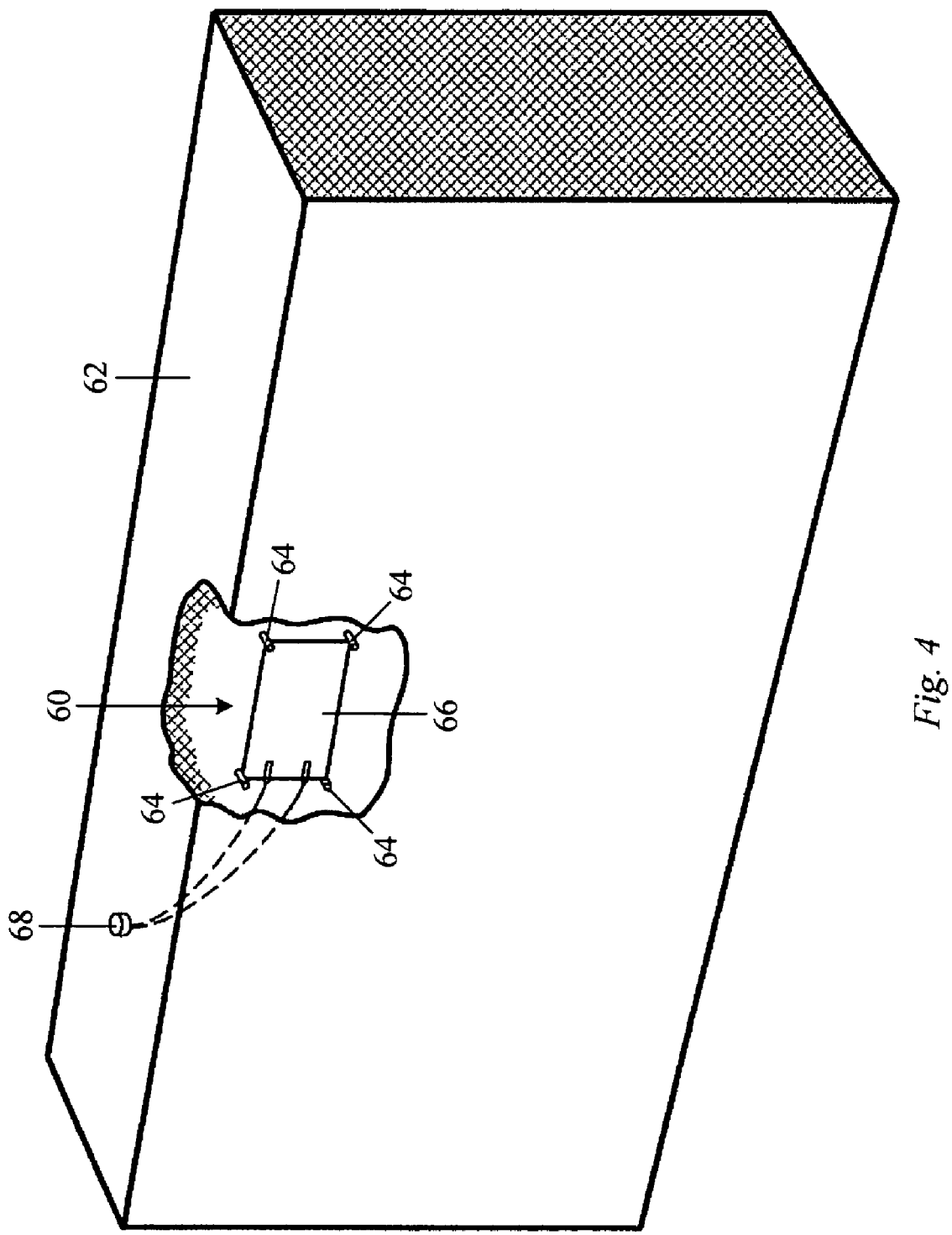
FIG. 4 is a partial cut-away view of a fourth conveyor and sensor in accordance with the invention.

Referring to FIG. 4, a tension sensor 60 embedded in a conveyor belt 62 is secured in position with pins 64 or similar constraints. A piezoelectric strain sensor 66 is connected to an LED 68 which is positioned at the surface of conveyor belt 62 or sightly recessed from the surface of belt 62 such that the LED is visible when illuminated. LED 68 is selected such that it will emit varying colors depending upon the electric potential generated by strain sensor 66. Thus, an operator or maintenance personnel may determine the tension of the belt by observing the color of the light emitted by LED 68.

The invention also provides a method that measures the total drift the belt undergoes by mounting a free to move surface element on the belt and connecting the element to the belt surface using a piezoelectric strip. Stretching force is measured as the equivalent voltage generated and correlated to the drifting pull acting on the belt. In an alternate variation the total drift may be measured using a set of permanent magnet actuators on a roller bearing and an embedded radio frequency generation device on the belt. The RF device generates different frequencies when in proximity of the permanent magnet actuators. The signal from the RF device is transmitted and collected at a base station. Depending on the frequency received, the immediate location of the belt and drift, if any, may be determined.

In accordance with the invention, a method for measuring the total number of complete cycles that a belt undergoes includes mounting a permanent magnet actuator at a specified location and embedding a radio frequency generation device in the belt. When the RF device is in the proximity of the magnetic actuator an RF signal at a unique characteristic frequency is generated. A counter identifies the signal and increments the total count of rotations or cycles.

A measurement of belt fatigue in accordance with the invention is performed by identifying changes in the micro structure inside the belt with an array of pairs of piezoelectric RF signal generators and one or more receivers embedded at pre-specified locations inside the belt. The application of a stress load on the belt causes the piezoelectric elements to generate electric energy that is use to generate an RF signal. The RF signal is received by the receiver and the corresponding time interval of transmission and receipt is recorded. Changes in time instance for each transmitter receiver pair reveals the change in the pattern of belt micro structure.

In accordance with the invention, measurement of belt wear may be performed by identifying the decay in the wave propagation from an array of pairs of piezoelectric RF signal generators and receivers embedded at pre-specified distances close to the belt surface. As the belt wears the parameters of transmitted signals change. The transmitted signals are received and the changes in signal parameters between transmitter-receiver pairs are analyzed to determine the amount and degree of belt wear.

The invention further provides a method for measurement of belt temperature including embedding a piezoelectric, magneto elastic or SAW micro sensor into the conveyor belt. The micro sensor measures the temperature as the shift in natural frequency of the sensor. The signal from the sensor may be transmitted as an RF signal to a local receiver for monitoring.

In one embodiment, the invention provides a method of measuring belt tension by embedding a set of conductors in the belt. The conductors are connected to a power source such that the conductors form part of an RC circuit. Changes in the state of material between the two conductors indicate changes in the condition of the belt. For example, material wear will result in a change in effective capacitance of the circuit. Belt tension may also be monitored with an embedded sensor that converts tension into an electrical input such as voltage, resistance or current that reflects immediate tension. The change in electrical input is utilized in a circuit with an LED that changes color based on the electrical input.

The invention further provides a method for monitoring the condition of bearings on belt drives and pulleys. Accordingly, one or more piezoelectric based RF transmitters are embedded in the belt and the proximity of the RF transmitter with respect to a bearing is determined. The Doppler shift in the transmitted frequency when the transmitter is in proximity of the bearing is monitored and compared to the difference in the frequency pattern with respect to a normal bearing or historical data. Changes in the shift indicate changes in the state of the bearing.

A method of measuring the relative speed of two belts that pinch and propel the mail pieces utilizes an embedded RF transmitter on one of the belts that transmits a RF signal unique to the belt. The signal reflected from the second belt is received and analyzed to determine any Doppler shift in the signal. The frequency of the Doppler shift is converted to the relative speed between the two belts.

A method and sensors in accordance with the invention may be utilized to measure scalloping or bending of a conveyor belt. An array of strips of piezoelectric material are embedded in the conveyor belt in the longitudinal and lateral directions. The electrical signals generated when the belt scallops or bends are collected and analyzed. The pattern of electrical signals is correlated to identify instances of scalloping or bending.

In another variation, a method of measuring conveyor belt loads and fatigue utilizes a micro array of nodes connected by a set of thin conducting wires. Relative motion between the nodes and mounted surface is zero and the physical properties of the wires are characterized by strain in the belt. Each of the wires is connected to a closed RF circuit and changes in the transmitted signals are measured over time to identify and correlate changes in the properties of the wires that correspond to belt loading and fatigue.

Sensors and transmitters in accordance with the invention are preferably sturdy enough such that the total life of the embedded sensor-transmitter is more than the life of the conveyor belt. The sensors are self sustained and require no external source of energy. Sensors are coupled with a module that converts energy due to stress on the belt and energy due to vibration, pinching, tension and bending of the belt into electric energy and stores the energy. The stored electric energy is used for measurement and transmission of signals. Sensors in accordance the invention may also be configured to generate and store energy using an inductive circuit that is activated by with a set of permanent magnets mounted in proximity with the belt.

The invention claimed is:

1. A method of monitoring a conveyor including a conveyor belt comprising:
   attaching a sensor to the conveyor belt, the sensor generating a signal indicating a condition or state of the conveyor belt which condition or state includes one of belt tension, belt scalloping, the number of cycles the belt has traveled, and belt stretching; and
   monitoring the signal generated by the sensor to determine the condition or state.

2. The method of claim 1 wherein the sensor includes a piezoelectric element connected to the belt to measure bending of the belt, an induction coil proximate the piezoelectric element, whereby bending of the piezoelectric element creates a current in the induction coil which powers an antenna connected to the induction coil, which antenna transmits the signal.

3. The method of claim 1 wherein the sensor measures belt tension.

4. The method of claim 1 wherein the sensor measures belt scalloping.

5. The method of claim 1 wherein the sensor records the number of cycles the belt has traveled.

6. The method of claim 1 wherein the sensor measures belt stretching.

7. The method of claim 1 wherein the sensor generates a radio frequency signal.

8. The method of claim 1 wherein the sensor generates a visual signal.

9. The method of claim 1 wherein the step of attaching the sensor to the belt comprises embedding the sensor in the belt.

10. A system for monitoring a conveyor including a conveyor belt, comprising:
    a sensing element attached to the conveyor belt for sensing a state or condition of the conveyor during operation; and
    an indicator on the conveyor belt connected to the sensing element for generating a signal indicating the state or condition.

11. The system of claim 10 wherein the sensing element is a piezoelectric element.

12. The system of claim 11 wherein the piezoelectric element senses deflection of the conveyor belt.

13. The system of claim 11 wherein the indicator is a transmitter for generating a radio frequency signal.

14. The system of claim 11 wherein the indicator is a light source.

15. The system of claim 11 wherein the sensor is embedded in the belt.

16. The system of claim 11 further comprising an inductor attached to the conveyor belt such that the inductor produces an electric current when carried past a magnet by the belt to power the sensor or indicator.

17. A system for monitoring a conveyor including a conveyor belt, comprising:
    a sensor embedded in the conveyor belt for sensing a state or condition of the conveyor belt during operation and generating a signal indicating the state or condition of the conveyor belt;
    a processor embedded in the conveyor belt connected to receive the signal from the sensor; and
    an indicator on the belt connected to the processor which is activated by the processor to indicate the state or condition.

18. The system of claim 17, which sensor is a piezoelectric element connected to the belt to measure bending of the conveyor belt, and
    the processor comprises a processor counter embedded in the belt and connected so that an electrical potential generated by the piezoelectric sensor upon bending of the belt causes the processor counter to increment a total count of cycles that the belt has traveled, and the processor counter activates the indicator when the count reaches a predetermined number.

19. The system of claim 17, wherein the indicator is an LED mounted on the belt and visible from the surface of the belt.

20. The system of claim 19, further comprising an inductor attached to the conveyor belt such that the inductor produces an electric current when carried past a magnet by the belt to power the indicator.

* * * * *